United States Patent [19]
Dominguez et al.

[11] Patent Number: 5,259,322
[45] Date of Patent: Nov. 9, 1993

[54] FIVE UNIT ARTICULATED COVERED HOPPER CAR

[76] Inventors: Danilo A. Dominguez, 1867 Piedras Cir., Danville, Calif. 94526; James F. Flores, 4 Overhill Rd., Mill Valley, Calif. 94941

[21] Appl. No.: 799,910

[22] Filed: Nov. 26, 1991

Related U.S. Application Data

[63] Continuation of Ser. No. 592,120, Oct. 1, 1990, abandoned, which is a continuation of Ser. No. 335,045, Apr. 7, 1989, Pat. No. 4,966,081.

[51] Int. Cl.$^5$ .................. B61D 17/00; B61D 7/00
[52] U.S. Cl. ................... 105/4.1; 105/247; 105/248; 105/421
[58] Field of Search .......... 105/3, 4.1, 159, 248, 105/420, 247, 413, 411, 419, 416, 421

[56] References Cited

U.S. PATENT DOCUMENTS

| | | | |
|---|---|---|---|
| D. 201,477 | 6/1965 | Larssen et al. | 105/248 |
| 934,299 | 9/1909 | Furgeson et al. | 105/248 |
| 2,104,840 | 1/1938 | Stucki | 105/4.1 |
| 2,730,964 | 1/1956 | Garlock | 105/248 |
| 3,339,499 | 9/1967 | Charles et al. | 105/248 |
| 3,399,631 | 9/1968 | Weber | 105/4.1 |
| 3,605,634 | 9/1971 | Johnson | 105/248 |
| 3,678,864 | 7/1972 | Gutridge | 105/4.1 |
| 3,687,084 | 8/1972 | O'Leary et al. | 105/248 |
| 4,348,962 | 9/1982 | Smith | 105/248 |
| 4,644,871 | 2/1987 | Arrey et al. | 105/4.1 |
| 4,771,702 | 9/1988 | Pavlick | 105/248 |

FOREIGN PATENT DOCUMENTS

| | | | |
|---|---|---|---|
| 0712104 | 10/1941 | Fed. Rep. of Germany | 105/4.1 |
| 0801239 | 7/1936 | France | 105/4.1 |
| 0202146 | 4/1939 | Switzerland | 105/4.1 |

*Primary Examiner*—Mark T. Le
*Attorney, Agent, or Firm*—Edward D. Gilhooly, Ltd.

[57] ABSTRACT

An articulated multi-unit railway hopper car including a pair of end units having couplers mounted on their outboard ends. A plurality of intermediate units are interconnected between said end units. A plurality of articulated connector assemblies interconnect the end units and the intermediate units. A pair of side bearing housings are mounted on each side of the articulated connector assemblies. A body side bearing extension arm assembly is disposed in bearing relationship with each of the side bearing housings and connects two ends of adjacent units. Torsion boxes extend substantially the width of the inboard ends of the end units and the opposed ends of the intermediate units and carry the upper bolster unit and are connected to the body side bearing extension arm assemblies.

1 Claim, 7 Drawing Sheets

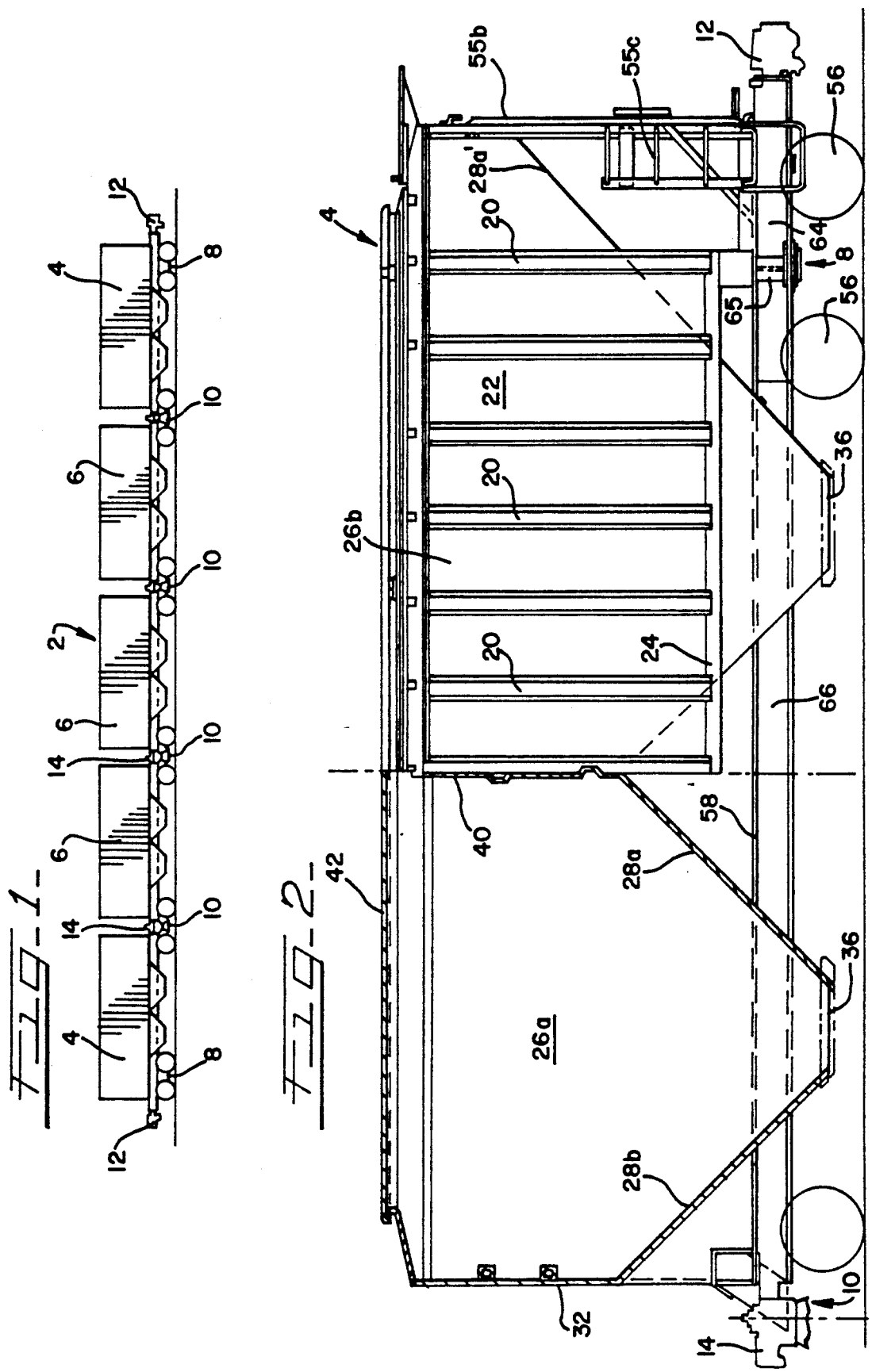

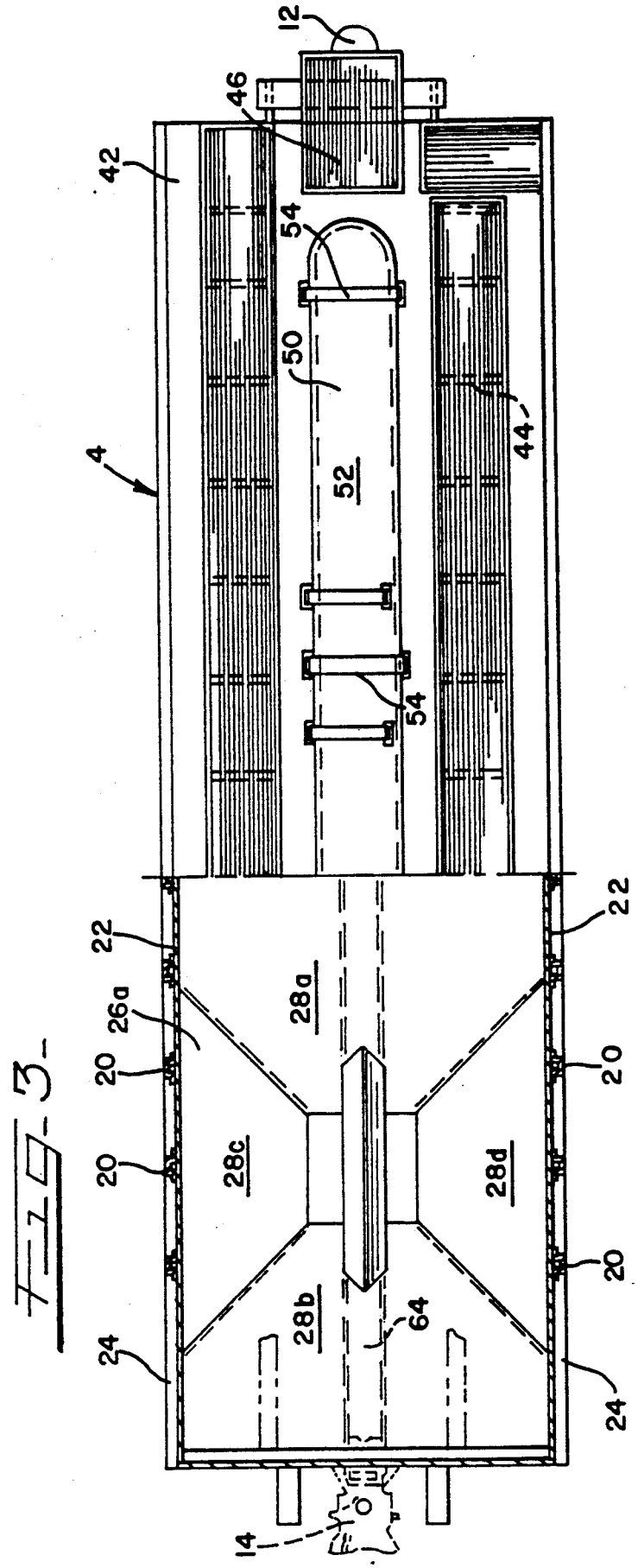

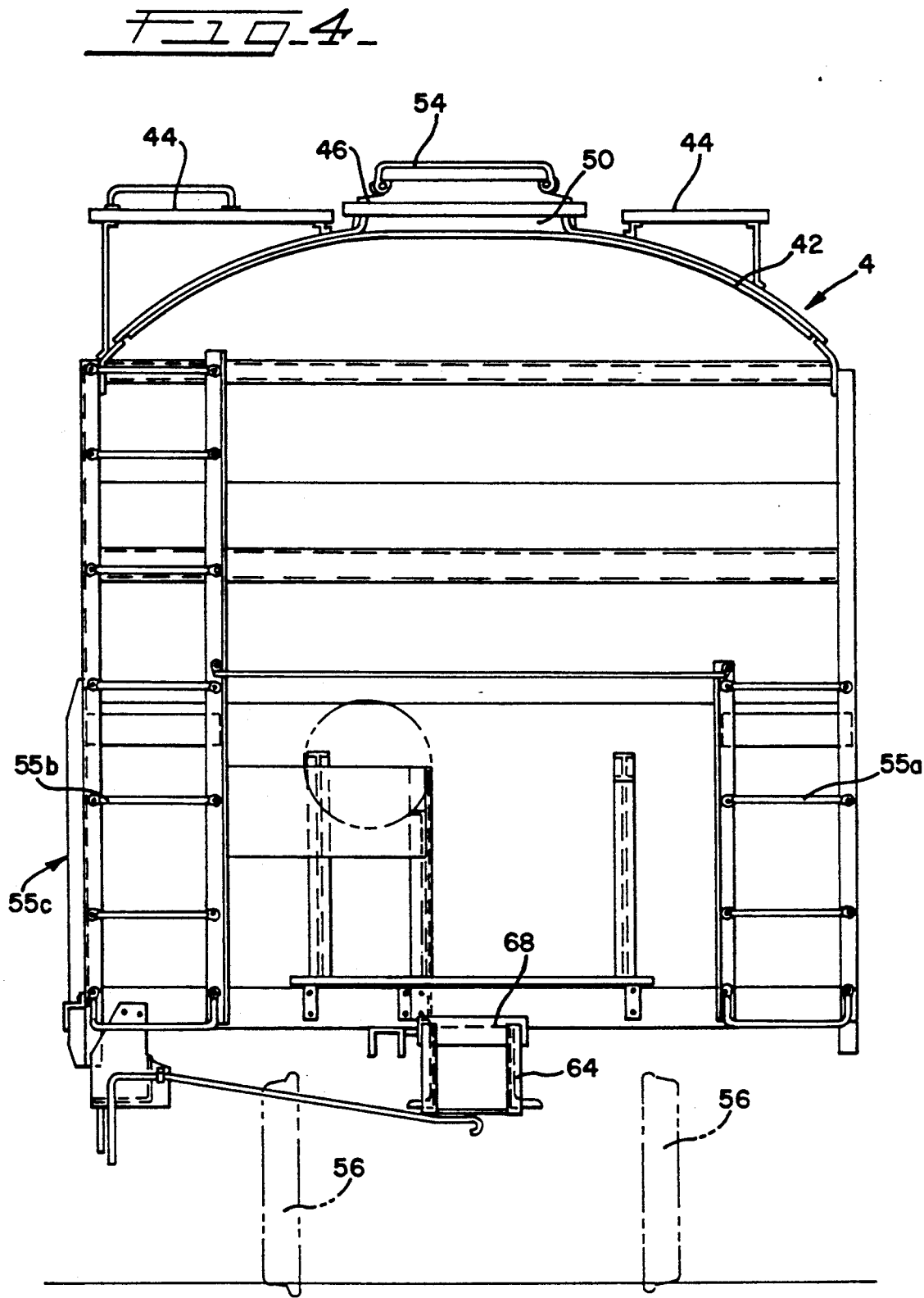

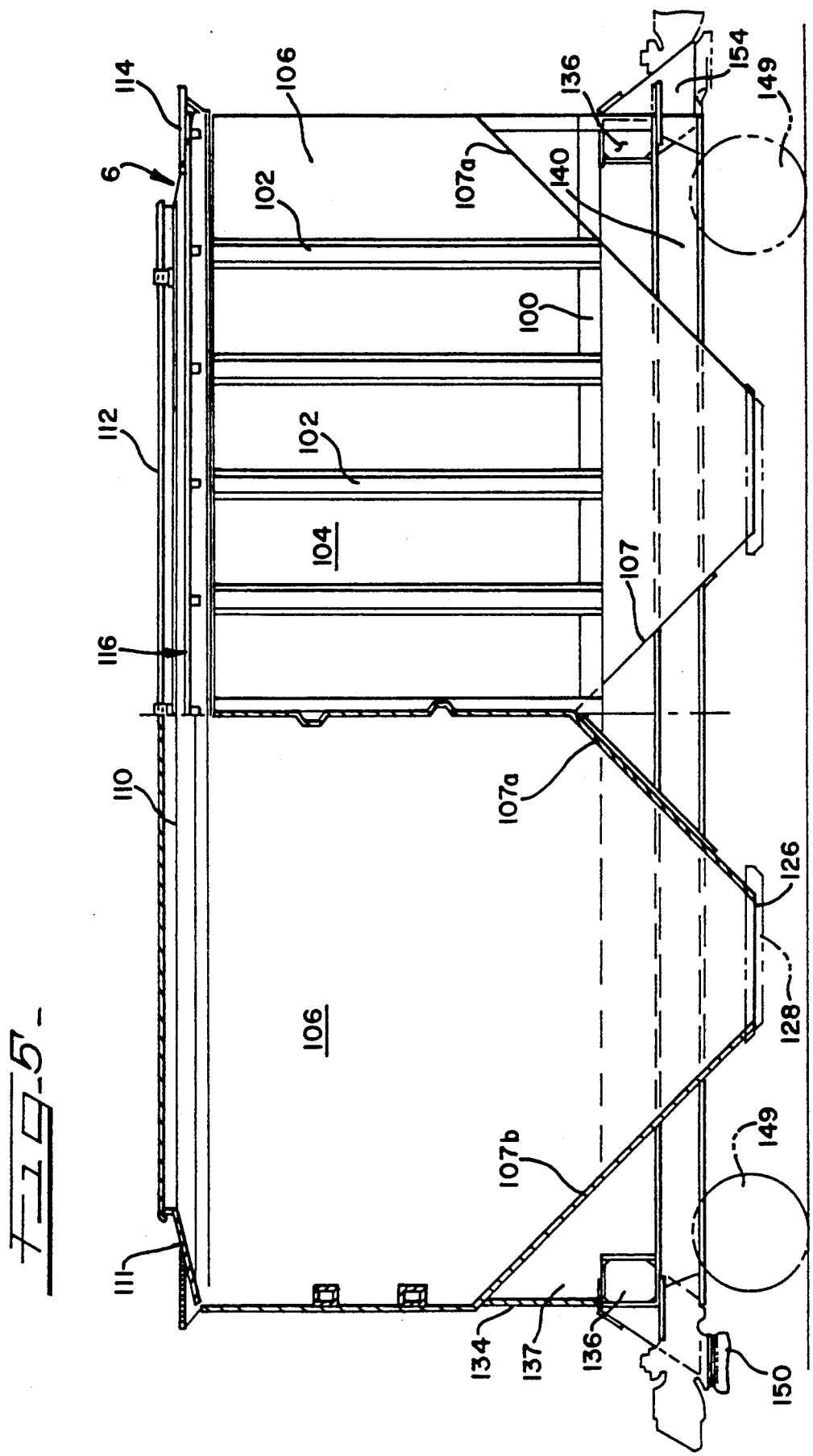

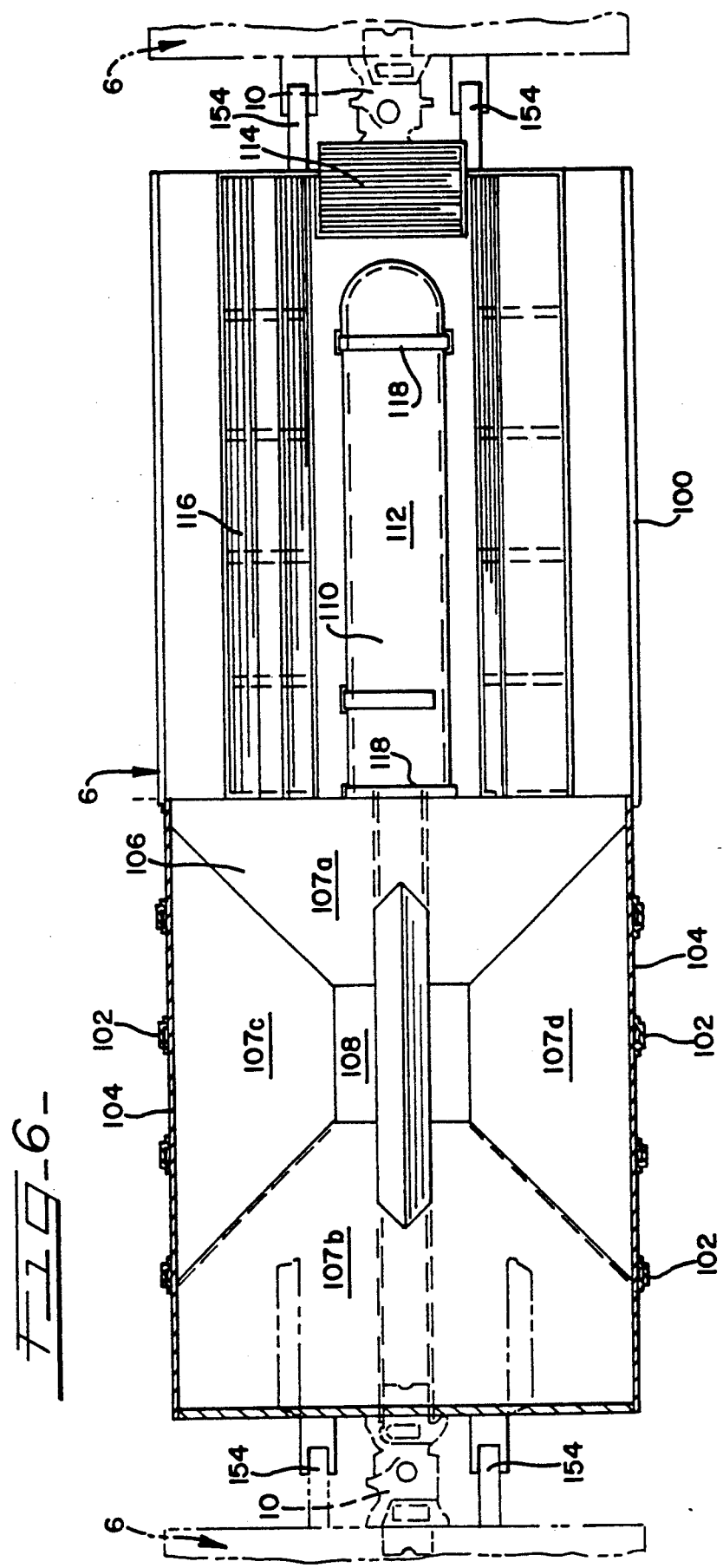

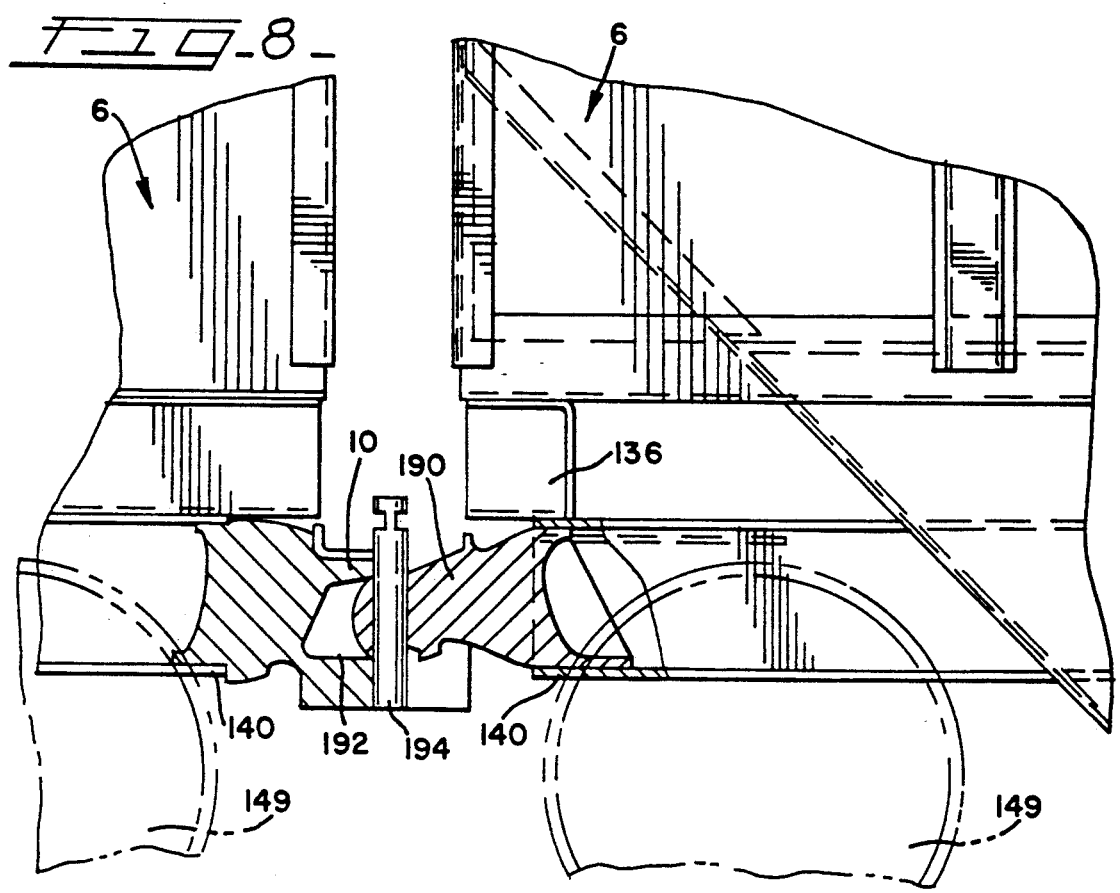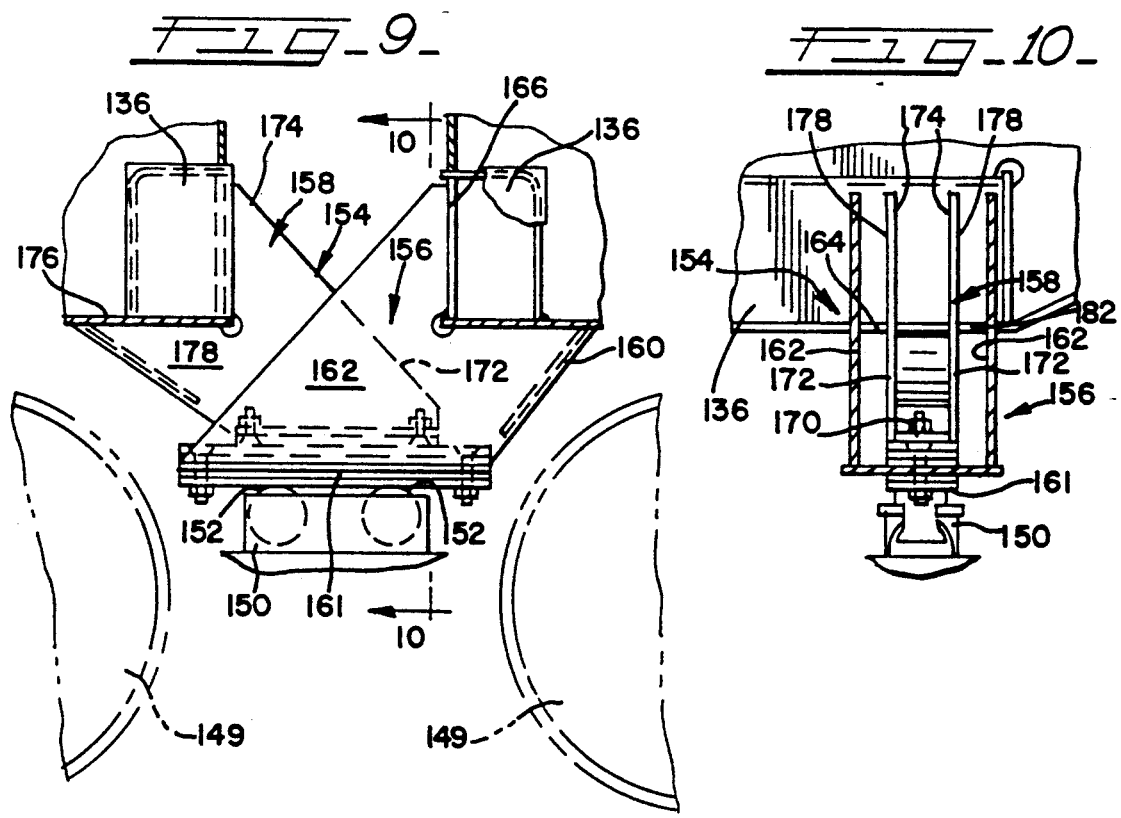

FIVE UNIT ARTICULATED COVERED HOPPER CAR

This is a continuation of U.S. Pat. application Ser. No. 592,120, field on Oct. 1, 1990, now abandoned, which is a continuation of U.S. Pat. application Ser. No. 335,045, filed on Apr. 7, 1989, now U.S. Pat. No. 4,966,081.

BACKGROUND OF THE INVENTION

1. Field of the Invention

This invention relates to railway cars and particularly to an articulated multi-unit railway car capable of optimum efficiency in operation.

2. Description of the Prior Art

Hopper cars have long been used in the railroad industry to transport bulk commodities, such as minerals, grain, certain chemicals and the like. Typically, a hopper car includes a covered or open top, through which the transported material is loaded, and a bottom discharge system. Bulk materials of the type previously described are predominantly transported in one hundred ton hopper cars having cubic capacities suitable for the densities of the commodities to be carried. The empty weights of those cars vary according to their volumetric capacities. The largest of the one hundred ton covered hopper cars in the United States and Canadian railcar fleets used to transport the materials previously described possess a volumetric capacity of 4,550 to 4,750 cubic feet. Open top hopper cars have volumes of 3,600 cubic feet up to 4,200 cubic feet. The empty weight of these large cars is in the range of 60,000 to 65,000 pounds. A hundred ton hopper car of such designs can be loaded to a gross weight of 263,000 pounds. The weight carrying capacity of each car is the difference between the gross weight-on-rail and empty car weight; therefore, cars having an empty weight of 60,000 to 65,000 pounds have respective carrying capacities of 203,000 to 198,000 pounds. A standard hopper car generally is a relatively long vehicle, such as having an overall coupler to coupler length of about 60 feet and a length of 45'-9" between truck centers. Because railroad clearances for right of ways in the Un:;ted States, Mexico, and Canada are defined by Association of American Railroads (AAR) clearance diagrams, the width of a standard hopper car having the foregoing truck center length is restricted to 10'-5¼".

One hundred ton covered hopper cars are equipped with industry approved standard components, including two each 100 ton three piece trucks, two each draft rigging sill assemblies with couplers, and one set of body mounted or truck mounted airbrake systems. The cars are also constructed with straight or curved sides, trough-type or round roof openings for loading, and sloping bottoms leading to three or four outlet gates for unloading. The conventional cars are further equipped with safety devices or appliances such as ladders, handbrakes, uncoupling rods, sill steps, roof running boards or walkways, crossover platforms, all designed and built to meet the requirements of Federal Railroad Administration (FRA) standards. The underframe construction is either a through center sill or shear plate and stub sill design. The underframe of such known hoppers incorporate the use of transverse body bolsters and longitudinal side sills that extend the length of the car for proper distribution of dead and live loads imposed on the structures. These cars are designed and built for interchange service between railroads and conform to standard specifications formulated by the AAR. The foregoing cars have been the industry standard for the transportation of bulk commodities since the early 1960s. Open top hopper cars have a similar design except for the elimination of the roof and associated equipment.

An indicative evaluation of the carrying capacity of a hopper car for bulk commodities is determined by computing the ratios of volume to lightweight, and load limit to lightweight. For a standard covered hopper car having a volume of 4,750 cubic feet and weighing 63,000 pounds, the volume to lightweight ratio is 0.0754 and the load limit to lightweight ratio is 3.175. In addition, these known hopper cars provide an approximate load limit to length ratio (i.e. 200,000 lbs./60 feet) of 3333.0 and a volume/length ratio (4,750 cu. ft./60 feet) of 79.2. The foregoing efficiencies and factors have been the generally expected limit for existing hopper cars. The railroad industry has become aware of the critical need to reduce the initial capital investment cost as well as day to day operating costs of its equipment. The previously described hopper cars, such as of the one hundred ton design, suffer serious drawbacks when considering the relative cost of the equipment and the overall efficiency of operation. There exist numerous areas from a operational standpoint in which improvements in efficiency should be highly desired by the industry. For example, known covered hopper cars possess an inefficient aerodynamic design and excessive weight that results in fuel inefficiency.

The maintenance cost for standard covered cars is also undesirably high. Costly maintenance can be directly attributed to the standard number of components in the design, such as the number of trucks and the like, that are required in a trainset of a large number of cars as is common. Existing hoppers have also demonstrated a relatively poor accident record, increasing costs by virtue of damage to the equipment and subsequent lading losses. All of the foregoing factors have a significant impact on the expected operating expense of standard hopper cars. Manufacturing costs of hopper cars as currently used are further dependent on the size and weight of the equipment for a given trainset. Because of the inherent design of current hopper cars, there is little hope of making any significant impact on the costs of manufacturing and maintenance. Accordingly, a critical need exists in the industry for new designs of hopper cars for carrying commodities that offer real savings in manufacturing and operating costs.

SUMMARY OF THE INVENTION

It is an objective of the present invention to reduce the costs of manufacturing and operating hopper cars for carrying lading, generally in the form of bulk commodities. The apparatus herein disclosed is directed to articulated covered hopper cars having opposite end units and a plurality of intermediate units. The teachings of the invention can also be applied to open top hopper cars. It has been discovered that the use of three intermediate units provides unexpected economy in manufacture and operation, although other number of multiple intermediate units may be used in accordance with the invention. The inboard ends of the end units and intermediate units are interconnected by articulated connector assemblies. The outboard ends of each end unit is fitted with standard couplers, body bolsters, body side bearings and body centerplates. The inboard ends of the end units have an identical construction as the ends of the intermediate units which differ from the design of the outboard ends. The inboard ends of the end units and the ends of the intermediate units employ an improved construction generally including a torsion box, center sills, and unique body side bearing extension arm assemblies for the shared truck assemblies. The foregoing extension arm assemblies permit the elimination of two truck side bearing assemblies at each unit connection with resulting closer spacing between units.

The multi-unit articulated hopper cars of the invention are intended for unit train operations. Because of the design of the articulated hopper cars herein disclosed, the underframes are designed to result in light weight end and intermediate units. Such a light weight structure is attained in part because each separate unit of the articulated car is shorter (i.e. approximately 27' to 28' between truck centers) than standard hopper cars (45'-9" between truck centers) that allows a lighter construction to withstand live, dead, and impact loads. The short truck centers also permit the car to be designed to the maximum AAR clearance width (i.e. 10'-8") for optimum volumetric capacity. This width is greater than the width of standard cars. The invention also permits the use of two lighter weight trucks. such as a 70 ton design on the outboard ends of end units, while heavier capacity truck assemblies, such as of a 125 ton design, can be shared by an end unit and intermediate unit or shared by two intermediate units. The decrease in car unit length and truck centers in the invention permits the car body to be designed lower to the top of the rails as determined by vertical curve negotiation calculations. A lower body results in a design of maximum volume within a given length, width, and height envelope and a lower center of gravity. The effect of the light body weight and truck utilization improves load carrying capacity (load limit/lightweight) over a standard hopper car by a significant 27 per cent when using a five unit articulated covered hopper car in accordance with the invention. For example, a comparable five-unit car as herein disclosed achieves an improved volume/lightweight ratio of 0.0916 and load limit/lightweight ratio 4.021 as compared to 0.0754 and 3.175, respectively, for a standard 100 ton covered hopper car. Moreover, a five unit articulated car of the invention as previously discussed attains a load limit to coupler-to-coupler length ratio (i.e. 680,700 lbs/ 152.51 ft) of approximately 4463.00 and volume/ length (i.e. 15,500 cu. ft./ 152.51 ft.) of about 102.0, improving the same ratios of standard hopper cars by approximately 33.9% and 28.30% respectively. Similar efficiencies can be attained for open hopper cars constructed in accordance with invention.

The foregoing improvement in efficiency ratios is particularly impressive when the articulated covered hopper cars of the invention are compared to standard 100 ton hopper cars having a capacity of 4,750 cubic feet. In cubic capacity, thirty articulated covered hopper cars, having five units each and constructed in accordance with the invention (i.e. cubic capacity of the end units being 3,248 cubic feet and intermediate units having a capacity of 3,002 cubic feet each), virtually equals the the volumetric capacity of ninety eight 100 ton standard hopper cars (4,750 cubic feet). A trainset of thirty such articulated cars of the foregoing capacity possesses an overall length of 1300 feet less than ninety eight 100 ton standard hopper cars. Since drag is dependent on train length, the articulated design of the invention therefore produces significantly improved aerodynamic performance and fuel savings over known designs. Further, the empty weight of a trainset as previously described in accordance with the invention weighs approximately 1.1 million pounds less than ninety-eight 100 ton standard hopper cars. The lighter weight permits an additional loading of 1.1 million pounds more than standard cars up to the maximum now permitted. The design of the invention, again comparing a thirty car trainset of the type herein disclosed and ninety eight standard cars, requires fewer car components, namely 16 fewer trucks, 32 less axles, 64 less roller bearings, 64 less wheels, 64 less brake shoes, 136 less draft rigging assemblies, 8 less brake schedules, 38 less handbrakes, 136 less ladder assemblies, 136 less crossover steps, and 92 less trough hatch covers. Through elimination of the foregoing car components, it is expected that maintenance expense of the articulated cars of the invention will be reduced by a very significant savings of 15 to 20 per cent. It is also apparent from the foregoing reduction of car components that manufacturing costs will be greatly less than standard hopper cars.

BRIEF DESCRIPTION OF THE DRAWINGS

FIG. 1 is a side elevational schematic view of the multi-unit articulated covered hopper car of the invention;

FIG. 2 is a side elevational view, with parts in section, of an end unit of the articulated covered hopper car of FIG. 1;

FIG. 3 is a top plan view, with parts in section, of the end unit of FIG. 2;

FIG. 4 is an elevational view of the outboard end of the end unit of FIG. 2;

FIG. 5 is a side elevational view, with parts in section, of an intermediate unit of the multi-unit articulated hopper car of FIG. 1;

FIG. 6 is a top plan view, with parts in section, of the intermediate unit of FIG. 5;

FIG. 8 is a partial side elevational view, with parts in section, of the articulated connector assembly for connecting two intermediate units of the mult-unit articulated hopper car of the invention;

FIG. 9 is a partial side elevational view of one of the body side bearing extension arm assemblies used in conjunction with the articulated connector assembly of FIG. 8 shown between adjoining intermediate units; and FIG. 10 is a partial elevational end view, with parts in section, of the body side bearing extension arm assembly of FIG. 9 taken along lines 10—10.

DESCRIPTION OF A PREFERRED EMBODIMENT

Figure 7:
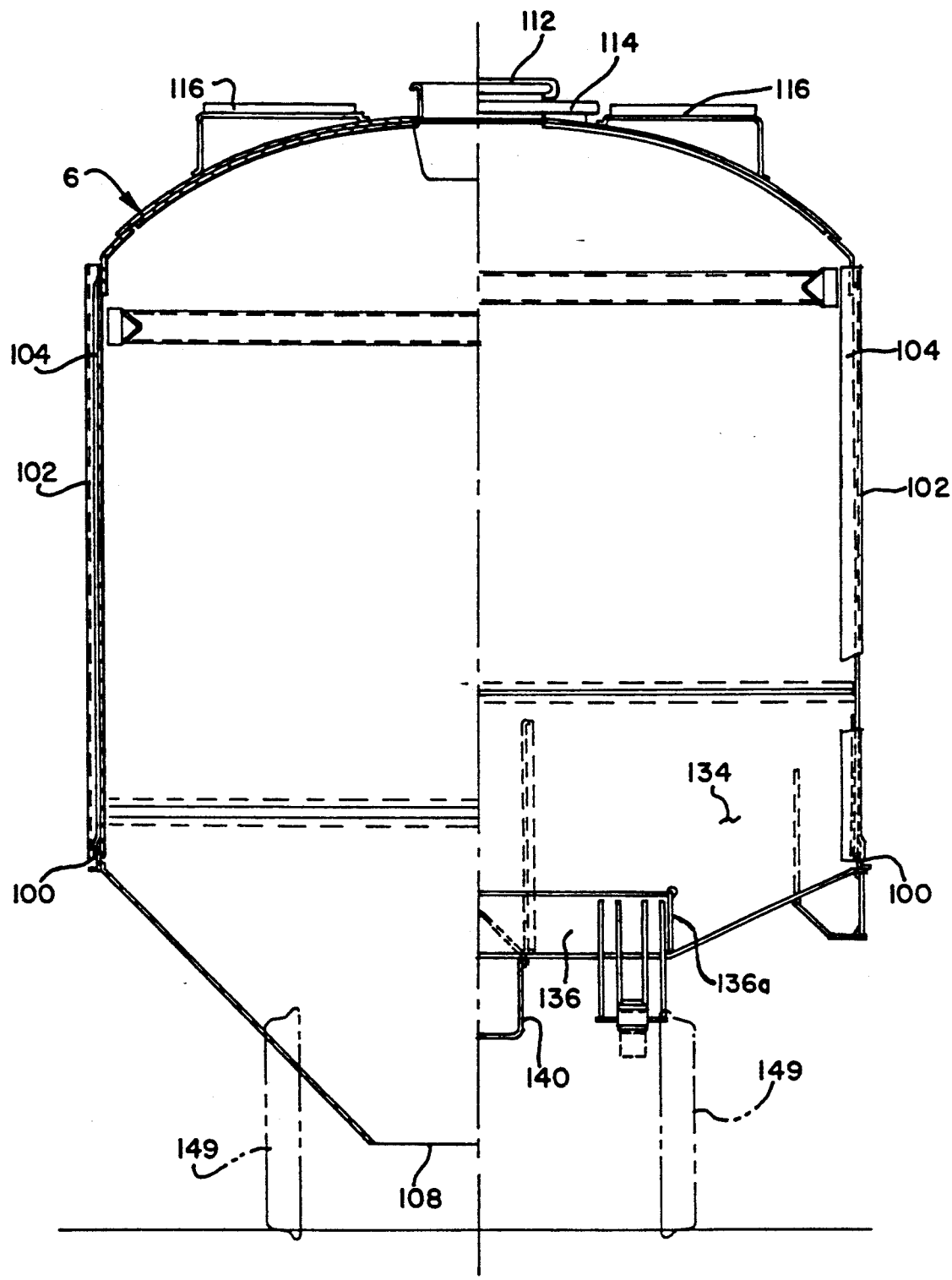
FIG. 7 is an end elevational view, with parts in section, of the intermediate unit of FIG. 5.

Referring now to FIGS. 1 to 10, there is illustrated the multi-unit articulated covered hopper car of the invention, generally designated by reference numeral 2. The articulated car 2 is intended to be used to transport bulk commodities of many kinds and comprises a pair of identical end units 4 and a plurality of intermediate units 6. Although other number of intermediate units can be employed in accordance with the teachings of the invention, it has been found that the use of three intermediate units 6 as shown in FIG. 1 is particularly efficient from the standpoint of manufacturing and operation as was previously discussed. Further, it should be noted that although articulated car 2 is illustrated as a covered hopper car, it is within the scope of the invention to apply its teachings to open top hopper cars as used with certain commodities.

Referring again to FIG. 1 the outboard ends of end unit 4 are supported by truck assemblies 8. The inboard ends of the intermediate units 6 share a truck assembly 10 in common, symmetrically arranged with an adjacent end unit 4 or an adjacent intermediate unit 6. In the five unit articulated car 2 of FIG. 1, two truck assemblies 8 and four truck assemblies 10 are utilized, with each truck assembly including four wheels. As seen in FIG. 1, the outboard ends of end units 6 possess a standard design and are provided with conventional couplers 12. The inboard ends of the end units 4 are connected to the adjoining intermediate unit 6 by an articulated connector assembly 14. An identical articulated connector assembly connects the intermediate units 6 to each other. The articulated connector assemblies 14, with other structure to be described, permit closer spacing of the inboard ends of the end units 4 with an adjacent intermediate unit 6 and between adjacent intermediate units 6 than permitted by standard couplers 12. Such closer spacing results in significant reductions in train weight and length and, hence drag, as compared to conventional cars in which standard couplers are used between each car.

Referring now to FIGS. 2-4, details of the right end unit 4, when viewing FIG. 1, are shown. The end unit 4 shown in FIGS. 2-4 has an identical construction as the opposite end unit 4, except with a reversed longitudinal arrangement of the components and variation of the male/female connectors used in articulated connector assemblies 14. The inboard ends of each end unit 4 has the corresponding cooperating components as both ends of the intermediate units 6 as will be described, while the outboard ends of the end units 4 differ by each including the standard coupler 12. The end unit 4 is formed with a body having side posts 20 and vertical side sheets 22 carried by a pair of longitudinally extending side sills 24. A pair of hoppers 26a, 26b for carrying commodities are suitably supported by known techniques positioned within the side sheets 22. Lower hopper floor sheets 28a, 28b, 28c, and 28d, which are suitably supported, of the hopper 26 (FIGS. 2 and 3) are sloped at an angle. The hopper floor sheet 28a' of the outboard hooper 26b possesses a longer length than the floor sheet 28a as seen in FIG. 2. End walls 32 are arranged above the floor sheets of hoppers 26a, 26b. The hoppers 26a, 26b terminate with discharge gates 36 at their respective bottoms extending beneath the side sills 24. A vertical partition sheet 40 is mounted above the sloped floor sheet 28a to retain the lading in a particular hopper.

The top of the end unit 4 is covered by a roof sheet 42 having a dome configuration upon which typical running boards 44 and end running boards 46 are fitted as best seen in FIG. 2-4. An elongated trough opening 50 (a portion of which is shown in FIG. 3) for receiving commodities is formed in the roof sheet 42 and is arranged to be covered by a hatch cover 52 that extends, for example, for approximately 80% of the length of the end unit 4. The trough opening 50 having a 24 inch width and rounded ends has been found to be suitable in the invention. The hatch cover 52 is conventionally retained by hatch cover battens 54. Conventional end ladders 55a, 55b and 55c are provided on the outboard end of end unit 4.

Again referring to FIGS. 1, 2, and 4, the truck assembly 8 is positioned beneath the outboard end of end unit 4 and is of a standard three piece design including a conventional bolster and side frames (not shown). The truck assembly 8 includes four wheels 56 disposed beneath the outboard end of end unit 4. A draft sill 64 having a conventional cross section supports a striker 68 and conventional coupler assembly 12 of a well known semi-automatic design. A body bolster 65 of known design is carried by the draft sill 64. The draft sill 64 extends from the coupler assembly 12 to a point inboard of body bolster 65. The inboard end of the draft sill 64 interconnects with a center sill 66 that extends to the inboard end of end unit 4. The center sill 66 is identical in cross section as the center sills of the intermediate units 6 to be described. For sake of example without limitation as to the capacity of the truck assembly, the outboard truck assembly 8 may have a capacity of 70 tons, when the volume of the end unit 4 is 3,248 cubic feet. The structure of the inboard ends of end unit 4 will be apparent from the following description of the intermediate unit 6.

Referring to FIGS. 5-10, there is illustrated one of the intermediate units 6 of the multi-unit articulated covered hopper car 2 as shown in FIG. 1. Each of the intermediate units 6 has the identical components as illustrated in FIGS. 5-10. The intermediate units 6 include a pair of side sills 100, side posts 102, and side sheets 104 similar to the end unit 4, although the length of each of the intermediate units 6 may be less. The interior of intermediate unit 6 is provided with two identical hoppers 106 shown having a smaller volumetric capacity than the hoppers of end unit 4. By way of example, the hoppers 106 of intermediate units 6 may have a total capacity of 3,002 cubic feet. It is within the scope of the invention, however, to vary the comparative sizes of the hoppers in the end units 4 and the intermediate units 6. The hoppers 106 include reinforced sloped floor portions 107a,b,c, and d that terminate with discharge openings 108. The hoppers 106 are loaded through upper trough opening 110 formed in roof sheet 111 and having rounded ends and extending for a length of greater than 70 per cent of the intermediate unit 6. The trough opening 110 having a 24 inch width and rounded ends has been found to be suitable in the invention. The trough opening 110 is covered by hatch cover 112. Cross over running boards 114 and side running boards 116 are positioned on the roof 111 adjacent through opening 110. Hatch cover battens 118 are used to retain the hatch covers 112 in place.

Hopper discharge chutes 126 forming opening 108 are disposed beneath the side sills 100 and are fitted with typical discharge gates 128. An upper bolster web 134 in the form of an end wall is mounted at each end of the intermediate unit 6 beneath a respective hopper 106. The upper bolster web 134 is carried by a laterally extending torsion box/end sill 136 extending substantially the width of intermediate unit 6 at each end. The opposed ends 136a of box beam 136 are free and unattached laterally at a position within the longitudinal axis of side sills 100 (FIG. 7). A pair of triangular gussets 137 connect a hopper floor sheet with bolster web 134, torsion box 136, and center sill 140. Center sill 140 extends the length of the intermediate units 6 and has the hollow box cross section as shown in FIG. 7. The center sill 140 is attached at each end of intermediate unit 6 to a underside of torsion box 136.

Two wheels 149 of the truck assembly 12 carrying intermediate unit 6 are disposed respectively under a pair of adjoining ends of intermediate units 6. The truck assembly 12 includes typical bolsters and side frames (not shown) supported beneath the ends of adjoining intermediate units 6 in a well known manner. For sake of example, each truck assembly 12 may have a capacity of 125 tons. Each truck assembly 12 of intermediate units 6 is equipped on opposite sides of center sill 140 with a pair of truck side bearing housing assemblies 150, one of which is shown in FIGS. 9 and 10. A pair of side bearing rollers 152 (FIG. 9), or alternatively a constant contact type side bearing (not shown), are mounted in bearing housing assembly 150. A body side bearing extension arm assembly 154, comprising a mating female extension arm 156 and male extension arm 158, are nested on the top of each truck side bearing housing assembly 150. The female extension arm 156 extends in parallel relationship to the longitudinal centerline of intermediate unit 6 and includes a base 161 and two opposed vertical walls 162 forming an opening 164. The two side walls 162 angularly extend upward from base 161 to an upper edge 166 being shaped to engage the torsion box 136 in welded attachment.

The male extension arm 158 includes a base 170 that bears against the base 161 of the female extension arm 156 through shims and wear plates. A pair of spaced arm members 172 project angularly upward from base 170 upward through opening 164 of the female arm section 156. The upper edges 176 of the male arm section 174 are shaped to engage torsion box 136 on the opposed intermediate unit 6 in welded engagement. As seen in FIG. 10 the outer surfaces 178 of spaced arm member 172 are spaced from the inner surfaces of walls 162 of the female extension arm 156 to provide a clearance 182 on each side. The clearance 182 between the female extension arm 156 and male extension arm 158 permits relative rotational movement for curve negotiation during operation. Further, the unique design of the body side bearing extension arm assembly 154 allows extremely close spacing of adjoining intermediate units 6, such as, for example, a very small distance of 12 inches apart, to achieve a significant reduction of the length of a given trainset of articulated hopper cars 2 of the invention. The body side bearing extension arm assembly 154 permits the use of two truck side bearings at each connection as opposed to four side bearings at each connection as utilized in known articulated connections.

The adjoining ends of intermediate units 6 are connected by articulated connector assembly 14 as previously described with reference to FIG. 1. As shown in FIG. 8, the articulated connector asssembly 14 is of a conventional design providing a slack-free connection and includes a cooperating male articulated connector 190 on one of adjoining intermediate units 6 and a female articulated connector 192 on the adjacent intermediate unit 6. A pin 194 connects the connectors 190 and 192 as a slack free unit. The connectors 190 and 192 are attached by a conventional technique to center sills 140 of opposed intermediate units 6 and are carried on the truck assembly (not shown).

In the foregoing description with reference to FIGS. 5-10, the cooperating structure between adjoining ends of intermediate units 6 was described. The inboard ends of end units 4 correspond identically to the structure and function of the previously described ends of intermediate units 6, including the use of a shared truck assembly 10, articulated connector assemblies 14 and body side bearing extension arm assemblies 154. Thus, the spacing between the inboard end of an end unit 4 and the adjacent intermediate unit 6 is similarly as close as the distance between intermediate units 6. From the foregoing it should be apparent that it is advantageous for interchangeability for a female extension arm 154 and male extension arm 156 be mounted on opposed ends of each intermediate unit 6. Similarly, a female arm assembly and male arm must be respectively situated on the inboard ends of the opposite end units 4.

What is claimed is:

1. An articulated hopper car comprising
   a plurality of units connected end to end, each of said units having center sill means and hopper means carried above said center sill means,
   a truck assembly being shared by said plurality of units at each end to end connection,
   a pair of sills extending parallel to said center sill on opposite sides thereof,
   an articulated connector assembly for connecting each of said plurality of units end to end,
   torsion beam means being coupled to said center beam means and said hopper means,
   said torsion beam means being laterally arranged above said center sill means of each of said units adjacent said end to end connections,
   hopper support means for supporting said hopper means, said hopper support means being affixed to said torsion beam means,
   said torsion beam means is a beam affixed to the top of said center sill means adjacent each of said end to end connections, said beam having opposite free ends disposed in spaced relation to said side sills, and
   side bearing means, said side bearing means being connected to said torsion beam.

* * * * *